(No Model.) 2 Sheets—Sheet 1.
J. C. POTTER.
FEEDING MECHANISM FOR MACHINERY FOR OPENING AND PREPARING COTTON.
No. 482,194. Patented Sept. 6, 1892.
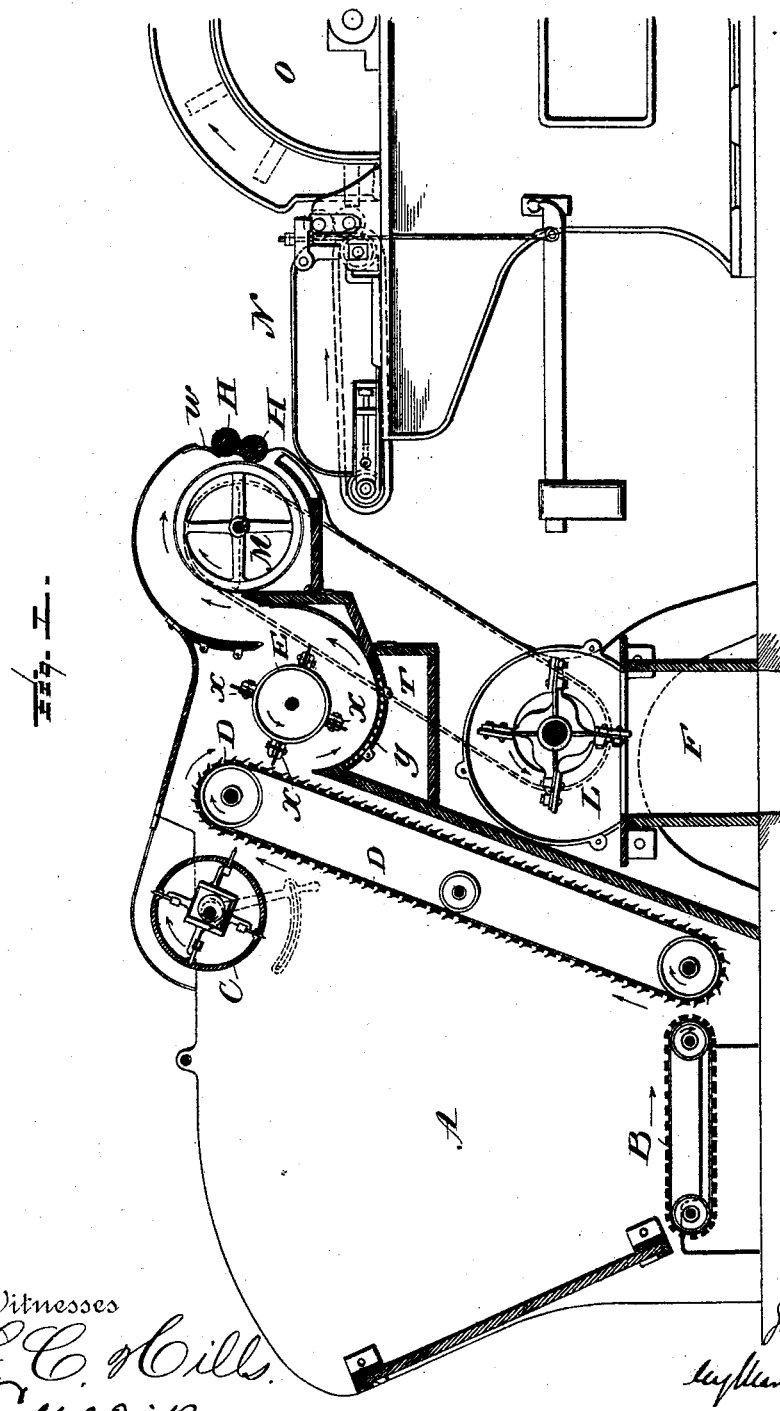

(No Model.) 2 Sheets—Sheet 2.
J. C. POTTER.
FEEDING MECHANISM FOR MACHINERY FOR OPENING AND PREPARING COTTON.
No. 482,194. Patented Sept. 6, 1892.
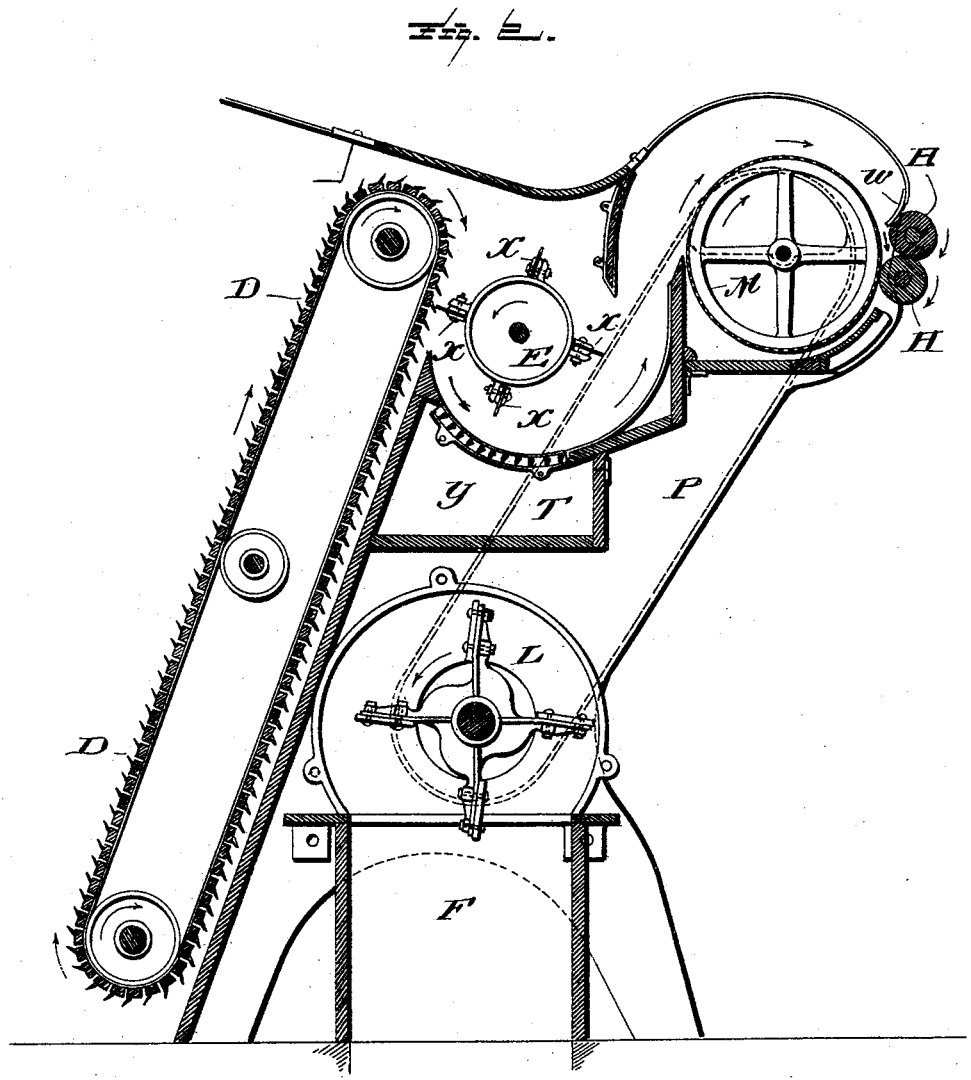
Witnesses
L. C. Hills.
Ewell A. Dick
Inventor
James C. Potter
by Marcellus Bailey
Attorney

UNITED STATES PATENT OFFICE.

JAMES C. POTTER, OF PAWTUCKET, RHODE ISLAND, ASSIGNOR TO THE POTTER & ATHERTON MACHINE COMPANY, OF SAME PLACE.

FEEDING MECHANISM FOR MACHINERY FOR OPENING AND PREPARING COTTON.

SPECIFICATION forming part of Letters Patent No. 482,194, dated September 6, 1892.

Application filed June 29, 1892. Serial No. 438,445. (No model.)

*To all whom it may concern:*

Be it known that I, JAMES C. POTTER, of Pawtucket, in the State of Rhode Island, have invented certain new and useful Improvements in Feeding Mechanism for Machinery for Opening and Preparing Cotton or other Fibrous Material, of which the following is a specification.

My invention is more particularly intended for feeding or delivering cotton to cotton openers and cleaners.

The object I have in view is in delivering cotton to the ordinary opener-apron, to free it from a great portion of its dirt and trash, to render it less lumpy and uneven, and to deliver it to the opener in sheet form. I employ for this purpose, in connection with the usual lifting-apron or spiked apron, a stripper, or as it may more properly be called, a "beater-clearer," a revolving cage, and a pair of stripper-rolls. The beater-clearer takes the cotton from the lifting-apron, and at the same time beats and lightens it up, shaking from it sand and dirt, which fall, while the cotton itself, lightened up by the operation, is carried forward to the revolving cage, on which it gathers, and is thence taken off by the stripper-rolls, which deliver it to the opener. With the cage I make use of a fan connected to its interior by air-trunks in the usual way, this fan serving to take off the light dust produced by the action of the beater-clearer and to carry forward the cotton taken by that device from the lifting-apron and to assemble it on the cage. This interposition of a revolving cage between the lifting-apron and the opening mechanism proper, which insures the delivery of the cotton in sheet form to the opener, I believe to be new with me.

The nature of my invention and the manner in which it may be carried into effect can be easily understood by reference to the accompanying drawings, the two figures of which represent in sectional side elevation so much of the machinery as is needed for the purposes of the invention. Figure 2 represents on a larger scale than in Fig. 1 the combination of devices in which my invention is more particularly comprised.

O is typical of any suitable opener or beater, of which N is the apron.

D is a spiked apron or lifting-apron of any suitable construction, located, as usual, at the end of a hopper A, on the bottom of which is the horizontal carrying-apron B.

At the upper end of the hopper, adjoining the lifting-apron, is a device C, which is intended to regulate the quantity of cotton delivered by the apron, which device I term an "equalizing-doffer." This device is of my invention, but forms no part of the present application, having been made by me the subject of another application, bearing Serial No. 438,444, of even date herewith. It is represented in the drawings as merely typical of the usual comb or equivalent device for removing the surplus stock from the lifting-apron.

On the other side of the lifting-apron from the device C is the beater-clearer E, which revolves in the direction of the arrow thereon and has a drum, which carries upon it longitudinal webs $x$, preferably of leather, (or I may use metal spikes or teeth instead,) which wipe against the teeth of the lifting-apron or very nearly wipe against them and strip from the apron the cotton held thereon, striking the cotton at the same time with some force, particularly if it be lumpy, opening it up and shaking out from it the heavy trash, sand, dirt, &c. The beater-clearer revolves in a sort of case closed at the top and having a curved bottom, in which are transverse grid-bars $y$, and it terminates at its front end in a passage which leads into another case containing the cage M. Beneath the grid-bars $y$ is the dirt-receptacle T, into which the heavy refuse separated from the cotton falls. The beater-clearer E revolves rapidly, and by its action, as well as by that of the cage-fan L, hereinafter referred to, the cotton is carried along the passage at the front of the beater-clearer into the case in which the cage M is located, where it gathers upon the cage, is stripped from the latter by the stripper-rolls H, and from them passes to the opener-apron N.

The cage M may be made in any suitable or customary way, either of wire or of perforated metal. It is mounted in suitable bearings in its case, so as to revolve, and is power-driven. With each of its ends communicates, as usual, an air and dust trunk P, (only one of them being shown,) leading to the exhaust-fan L, the case of which opens into the exhaust-trunk F, through which the dust, &c., are discharged, as customary where wire cages are employed in cotton machinery. The stripper-rolls H are power-driven. The upper one is to be arranged so that it can rise or fall in its bearings, so as to pass cotton of varying thickness, and a flap $w$ is put at the front end of the case or cage M over the stripper-roll H to exclude air from entering above the roll as the latter rises and falls.

The parts E M H L, and also D, B, and C, are each and all power-driven, the movement being taken from the shaft of the beater O, as customary in similar cases. I have not deemed it necessary, however, to illustrate any such driving mechanism. The direction of movement of the several parts is indicated by the arrows placed upon them, respectively, and the manner of arranging the driving-gearing for the purpose will be understood by the skilled mechanic without further explanation.

I remark that by reason of the organization and arrangement of parts herein illustrated and described I am enabled to drive the beater-clearer E at a very high rate of speed, so that it acts not merely as a stripper and conveyer, but also to some extent as an opener, which puts the cotton in condition to be most effectively acted upon by the opening mechanism subsequently.

Having described my improvements, what I claim herein as new and of my own invention is as follows:

1. The combination of the lifting-apron, the beater-clearer, the revolving cage, and the stripper-rolls, substantially as herein set forth.

2. The combination, with the cotton-opener and lifting-apron from which cotton is delivered to the opener, of an intermediate revolving cage and means whereby the cotton is delivered from the lifting-apron to the cage and from the cage to the opener, substantially as herein set forth.

In testimony whereof I affix my signature in presence of two witnesses.

JAMES C. POTTER.

Witnesses:
  EWELL A. DICK,
  L. C. HILLS.